United States Patent
Berggren (10) Patent No.: US 10,660,073 B2
(45) Date of Patent: May 19, 2020

(54) ALLOCATION SCHEME FOR A PHYSICAL UPLINK CONTROL CHANNEL UTILIZED BY NETWORK NODE USER DEVICES CAPABLE OF CARRIER AGGREGATION

(71) Applicant: Huawei Technologies Co., Ltd., Shenzhen (CN)

(72) Inventor: Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/722,684

(22) Filed: Oct. 2, 2017

(65) Prior Publication Data

US 2018/0027550 A1   Jan. 25, 2018

Related U.S. Application Data

(63) Continuation of application No. PCT/EP2015/057566, filed on Apr. 8, 2015.

(51) Int. Cl.
*H04W 72/04* (2009.01)
*H04W 72/12* (2009.01)
*H04W 74/00* (2009.01)

(52) U.S. Cl.
CPC ..... *H04W 72/0413* (2013.01); *H04W 72/042* (2013.01); *H04W 72/1268* (2013.01); *H04W 72/1284* (2013.01); *H04W 74/004* (2013.01)

(58) Field of Classification Search
CPC .......... H04W 72/0413; H04W 74/004; H04W 72/004
See application file for complete search history.

(56) References Cited

U.S. PATENT DOCUMENTS 8,867,496 B2   10/2014   Han et al.
2009/0318158 A1   12/2009   Yamada et al.
(Continued)

FOREIGN PATENT DOCUMENTS

CN   102149202 A   8/2011
JP   2014143738 A   8/2014
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211 V12.5.0, 3rd Generation Partnership Project, Valbonne, France (Mar. 2015).
(Continued)

*Primary Examiner* — Awet Haile
*Assistant Examiner* — Nevena Zecevic Sandhu
(74) *Attorney, Agent, or Firm* — Leydig, Voit & Mayer, Ltd.

(57) ABSTRACT

A network node and a user device are provided. The network node comprises: a processor configured to allocate a plurality of Physical Resource Blocks (PRBs) for a Physical Uplink Control Channel (PUCCH) having a PUCCH format defined for two or more PRBs, wherein the allocated plurality of PRBs are associated with a user device; a transceiver configured to signal allocation information to the user device, wherein the allocation information comprises a frequency location and a number of allocated plurality of PRBs. The user device comprises: a processor configured to determine uplink control information for one or more network nodes; a transceiver configured to transmit the uplink control information in a PUCCH to the one or more network nodes, wherein a plurality of PRBs are allocated for the
(Continued)

PUCCH and wherein the PUCCH has a PUCCH format defined for two or more PRBs.

19 Claims, 8 Drawing Sheets

(56) References Cited

U.S. PATENT DOCUMENTS

| | | | |
|---|---|---|---|
| 2011/0281614 A1* | 11/2011 | Kitahara | H04W 52/146 |
| | | | 455/522 |
| 2012/0263060 A1 | 10/2012 | Suzuki et al. | |
| 2013/0102320 A1 | 4/2013 | Suzuki et al. | |
| 2013/0188589 A1* | 7/2013 | Nakashima | H04B 7/0404 |
| | | | 370/329 |
| 2013/0223301 A1 | 8/2013 | Lee et al. | |
| 2014/0146720 A1 | 5/2014 | Tang et al. | |
| 2015/0131565 A1* | 5/2015 | Nakashima | H04L 1/0026 |
| | | | 370/329 |
| 2015/0181566 A1* | 6/2015 | Stopler | H04W 72/0413 |
| | | | 370/329 |
| 2016/0174213 A1* | 6/2016 | Webb | H04L 5/0051 |
| | | | 370/336 |
| 2016/0192388 A1* | 6/2016 | Ekpenyong | H04W 72/1284 |
| | | | 370/329 |
| 2016/0330693 A1* | 11/2016 | Hwang | H04W 52/146 |
| 2017/0295005 A1* | 10/2017 | Lee | H04L 5/0053 |

FOREIGN PATENT DOCUMENTS

| | | |
|---|---|---|
| WO | 2011052312 A1 | 5/2011 |
| WO | 2013023461 A1 | 2/2013 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.5.0, 3rd Generation Partnership Project, Valbonne France (Mar. 2015).

"3rd Generation Partnership Project; Technical Specification Group Radio Access Network; Evolved Universal Terrestrial Radio Access (E-UTRA); Physical layer procedures (Release 12)," 3GPP TS 36.213 V12.5.0, 3rd Generation Partnership Project, Valbonne, France (Mar. 2015).

"HARQ-ACK transmission on PUCCH for Rel-13 CA," 3GPP TSG RAN WG1 Meeting #80, Athens Greece, R1-150105, 3rd Generation Partnership Project, Valbonne, France (Feb. 9-13, 2015).

"On CA enhancements supporting up to 32 component carriers," 3GPP TSG RAN WG1 Meeting #80, Athens, Greece R1-150390, 3rd Generation Partnership Project, Valbonne France (Feb. 9-13, 2015).

201580075122.X, Office Action, dated Apr. 26, 2019.

* cited by examiner

| | | |
|---|---|---|
| m=1 | m=0 | PRB#M-1 |
| m=3 | m=2 | PRB#M-2 |
| m=5 | m=4 | PRB#M-3 |
| m=7 | m=6 | PRB#M-4 |
| m=9 | m=8 | PRB#M-5 |
| m=11 | m=10 | PRB#M-6 |
| ... | ... | |
| m=10 | m=11 | PRB#5 |
| m=8 | m=9 | PRB#4 |
| m=6 | m=7 | PRB#3 |
| m=4 | m=5 | PRB#2 |
| m=2 | m=3 | PRB#1 |
| m=0 | m=1 | PRB#0 |
| Slot 0 | Slot 1 | |

ALLOCATION SCHEME FOR A PHYSICAL UPLINK CONTROL CHANNEL UTILIZED BY NETWORK NODE USER DEVICES CAPABLE OF CARRIER AGGREGATION

CROSS-REFERENCE TO RELATED APPLICATIONS

This application is a continuation of International Application No. PCT/EP2015/057566, filed on Apr. 8, 2015, the disclosure of which is hereby incorporated by reference in its entirety.

TECHNICAL FIELD

The present disclosure relates to a network node and a user device. Furthermore, the present disclosure also relates to corresponding methods, a computer program, and a computer program product.

BACKGROUND

UpLink (UL) control channels are utilized to provide the base station with Hybrid Automatic Repeat reQuest (HARQ) feedback in response to DownLink (DL) data transmissions, Scheduling Request (SR) for the uplink as well as Channel State Information (CSI) reports corresponding to downlink carriers. For carrier aggregation, the Uplink Control Information (UCI) overhead can become extensive, considering the User Equipment (UE) can be scheduled on multiple downlink carriers simultaneously, which not only increases the HARQ feedback but also the need for more CSI reports to assist the scheduling.

The UCI overhead is even more severe for Time Division Duplex (TDD) systems, since there are typically less uplink subframes available than downlink subframes, which implies that the UCI payload becomes larger per transmission attempt of the uplink control channel. In Long Term Evolution Advanced (LTE-Advanced) Rel-12, a UE can be configured to aggregate up to 5 serving cells (i.e., different carriers in an eNodeB), where a serving cell comprises at least a downlink component carrier and where each carrier has at most 20 MHz bandwidth. The UE is always configured with a UE-specific primary serving cell having both a downlink and uplink component carrier. The uplink control channel is transmitted on the primary serving cell. Additionally, a UE can be configured to aggregate up to 4 UE-specific secondary serving cells.

The Physical Uplink Control Channel (PUCCH) in LTE-Advanced comprises several PUCCH formats, e.g., formats 1/1a/1b/2/2a/2b/3, each being used for a particular purpose of SR transmission, HARQ feedback and periodic CSI reporting. The payload of these PUCCH formats range from 1 to 22 information bits. PUCCH formats 1/1a/1b/2/2a/2b are based on modulated sequences, while PUCCH format 3 is using Discrete Fourier Transform (DFT) spread transmission. Several of the PUCCH formats also include Code Division Multiplexing (CDM) transmission, such that multiple UEs could be transmitting the PUCCH on the same Physical Resource Block (PRB) pair by utilizing different sequences. PUCCH formats 1/1a/1b/2/2a/2b could share the same PRB pair, while PUCCH format 3 PRB pairs cannot be shared with other PUCCH formats. A characterizing feature is that all the PUCCH formats utilize QPSK modulation and occupy only 1 PUCCH region, which comprises one PRB pair.

The resource allocation includes providing the UE with information such that it can derive what sequences and PRB pairs it should use for the PUCCH transmission. The PUCCH resources for PUCCH formats 2/2a/2b are semi-statically configured and would typically be located at the outer PUCCH regions close to the edge of the carrier. These formats are primarily used for periodic CSI reporting. The PUCCH resources for PUCCH formats 1a/1b can be derived implicitly from the PDCCH or the Enhanced Physical Downlink Control Channel (EPDCCH) that was used for scheduling the associated Physical Downlink Shared Channel (PDSCH). Thus, they are allocated dynamically on a need basis. PUCCH resources for PUCCH formats 1a/1b could also be semi-statically configured for the case where there is no associated PDCCH/EPDCCH, e.g., for Semi-Persistent Scheduling (SPS). Typically, up to 18 UEs could be multiplexed within a PBR pair, utilizing different cyclic shifts of the transmitted sequence to achieve CDM transmission. PUCCH format 3 can, e.g., be used if the UE is scheduled on at least one secondary serving cell. Up to 5 UEs can be multiplexed within a PRB pairs by utilizing different spreading codes. A set of semi-statically PUCCH resources is configured for PUCCH format 3 and a resource is dynamically indicated from this set by an indicator in the associated PDCCH/EPDCCH on a secondary cell. If the UE is only scheduled on its primary serving cell, it is using PUCCH formats 1/1a/1b resources.

SUMMARY

An objective of embodiments of the present disclosure is to provide a solution which mitigates or solves the drawbacks and problems of conventional solutions.

An "or" in this description and the corresponding claims is to be understood as a mathematical OR which covers "and" and "or", and is not to be understand as an XOR (exclusive OR).

The above objectives are solved by the subject matter of the independent claims. Further advantageous implementation forms of the present disclosure can be found in the dependent claims.

According to a first aspect of the disclosure, the above mentioned and other objectives are achieved with a network node for a wireless communication system, the network node comprising:

a processor configured to allocate a plurality of Physical Resource Blocks, PRBs, for a Physical Uplink Control Channel, PUCCH, having a PUCCH format defined for two or more PRBs, wherein the allocated plurality of PRBs are associated with a user device;

a transceiver configured to signal allocation information to the user device, wherein the allocation information comprises a frequency location and a number of allocated plurality of PRBs.

With a network node having the capabilities to allocate a PUCCH having a PUCCH format defined for two or more PRBs and to transmit the allocation information to a user device a number of advantages are provided.

An advantage is that the present network node provides the ability of accommodating large UCI payloads on the PUCCH by utilizing two or more PRB pairs and also improved and flexible PUCCH resource utilization by signalling the locations and numbers of the allocated PRBs to the user device. Therefore, the present network node provides the advantage of flexible allocation of the PRB pairs in terms of determining the number of PRB pairs as well as the positions in both time and frequency domains. Thus, it renders that fewer PRB pairs need to be reserved since the network node could allocate a minimum number of PRB pairs for accommodating the UCI payload while offering sufficient UCI detection performance. Moreover, savings in number of PRB pairs can be achieved by configuring overlapping PRB pairs for different PUCCH formats and using allocation information conveyed in the downlink control channel to avoid resource collisions.

In a first possible implementation form of a network node according to the first aspect, at least two of the allocated plurality of PRBs are contiguously located in the frequency domain and within the same time slot.

A time slot should in this disclosure be understood as a time resource of a wireless communication system. The time slot can therefore be considered as a time resource defined in a suitable time unit. For example, in LTE the time slot has duration of 0.5 ms and two time slots comprise one subframe of 1 ms. However, the time slot of the present disclosure may have a shorter or a longer time duration than 0.5 ms.

Advantages of this first possible implementation form of the first aspect include the possibility to perform Discrete Fourier Transform (DFT) precoding on the plurality of contiguous PRBs which results in a signal with low Peak-to-Average-Power-Ratio (PAPR). This allows the network node to reduce the power back-off which improves the probability of the network node to correctly receive the PUCCH and the UCI sent from the user device.

In a second possible implementation form of a network node according to the first possible implementation form of the first aspect or to the first aspect as such, at least two of the allocated plurality of PRBs are located at the same frequency and within different contiguous time slots.

Advantages of this second possible implementation form of the first aspect include the possibility to interpolate channel estimates between the different time slots. This results in better channel estimates which improves the probability of the network node to correctly receive the uplink control information from the user device.

In a third possible implementation form of a network node according to any of the preceding possible implementation forms of the first aspect or to the first aspect as such, the allocation information further comprises at least one of a modulation type and a modulation level for the allocated plurality of PRBs.

Advantages of this third possible implementation form of the first aspect include the possibility for better PUCCH resource utilization by adapting the payload to a modulation type or a modulation level, which may result in a need for fewer PRBs or PRB pairs and improved detection performance of the PUCCH.

In a fourth possible implementation form of a network node according to the third possible implementation form of the first aspect or to the first aspect as such, at least one of the frequency location and the number of allocated plurality of PRBs is jointly encoded with at least one of the modulation type and the modulation level.

Advantages of this fourth possible implementation form of the first aspect include the possibility to reduce the amount of bits needed for the transceiver to signal the allocation information. Therefore, overhead is reduced in the wireless communication system.

In a fifth possible implementation form of a network node according to any of the preceding possible implementation forms of the first aspect or to the first aspect as such, the allocation information is signalled as physical layer signalling in a downlink control channel (e.g., by bits in a Downlink Control Information (DCI) format), or as higher layer signalling (e.g., by bits/information delivered by Radio Resource Control (RRC) signalling), or as a combination thereof (e.g., by associating bits in a DCI with RRC configured PRB pairs).

Advantages of this fifth possible implementation form of the first aspect include the possibility to reduce the amount of bits needed for the transceiver to signal the allocation information. Therefore, overhead is reduced in the wireless communication system.

In a sixth possible implementation form of a network node according to any of the preceding possible implementation forms of the first aspect or to the first aspect as such, the allocation information is signalled as indices or bitmaps.

Advantages of this sixth possible implementation form of the first aspect include the possibility to reduce the amount of signalling needed for the transceiver to signal the allocation information, while offering flexible allocations. Therefore, overhead is reduced in the wireless communication system.

In a further possible implementation form of a network node according to the sixth possible implementation form of the first aspect, each index is associated with a bitmap and/or each index is signalled with bits in a downlink control channel.

Therefore, overhead is reduced in the wireless communication system with these implementation forms of the first aspect.

In a seventh possible implementation form of a network node according to the sixth possible implementation form of the first aspect or to the first aspect as such, each index is associated with a set of allocated PRBs contiguously located in the frequency domain and configured by higher layers.

Advantages of this seventh possible implementation form of the first aspect include the possibility to reduce the amount of signalling on a downlink control channel for providing the allocation information. Therefore, overhead is reduced in the wireless communication system.

In an eighth possible implementation form of a network node according to the seventh possible implementation form of the first aspect or to the first aspect as such, there are at least two sets of allocated PRBs having different sizes.

Advantages of this eighth possible implementation form of the first aspect include the possibility to utilize different numbers of PRBs or PRB pairs depending on, e.g., the UCI payload. This implies allocation flexibility, reduced overhead and adaption to different transmission conditions and requirements.

In a ninth possible implementation form of a network node according to any of the preceding possible implementation forms of the first aspect or to the first aspect as such, the transceiver further is configured to receive uplink control information in the PUCCH from the user device in response to signalling the allocation information.

Advantages of this eighth possible implementation form of the first aspect include that the wireless communication system can take full advantage of the new PUCCH format according to the present solution since the user device makes transmissions according to the new PUCCH format.

According to a second aspect of the disclosure, the above mentioned and other objectives are achieved with a user device for a wireless communication system, the user device comprising:

a processor configured to determine uplink control information for one or more network nodes;

a transceiver configured to transmit the uplink control information in a PUCCH to the one or more network nodes, wherein a plurality of PRBs are allocated for the PUCCH and wherein the PUCCH has a PUCCH format defined for two or more PRBs.

The present user device according to the second aspect being capable of transmitting uplink control information in PUCCH having a PUCCH format defined for two or more PRBs provides a number of advantages.

An advantage with the user device according to the second aspect include that the user device can transmit the new PUCCH thereby making possible the support of increased number of supported carriers since the payload capacity can be increased. Also payload flexibility of the PUCCH is provided.

In a first possible implementation form of a user device according to the second aspect, the transceiver further is configured to receive allocation information from the one or more network nodes in physical layer signalling or in higher layer signalling or in a combination thereof, wherein the allocation information comprises a frequency location and a number of allocated plurality of PRBs;

the transceiver further is configured to transmit the uplink control information in the PUCCH according to the allocation information.

An advantage with this first implementation form of the second aspect include that the PUCCH transmission of the user device can be dynamically or semi-statically controlled. This means that the PUCCH transmissions can be adapted to e.g., radio access network and environmental conditions implying improved performance and increased throughput. Further, even more payload flexibility of the PUCCH is provided with first implementation form of the second aspect.

According to a third aspect of the disclosure, the above mentioned and other objectives are achieved with a method for a wireless communication system, the method comprising:

allocating a plurality of PRBs for a PUCCH having a PUCCH format defined for two or more PRBs, wherein the allocated plurality of PRBs are associated with a user device;

signalling allocation information to the user device, wherein the allocation information comprises a frequency location and a number of allocated plurality of PRBs for the PUCCH format.

In a first possible implementation form of a method according to the third aspect, at least two of the allocated plurality of PRBs are contiguously located in the frequency domain and within the same time slot.

In a second possible implementation form of a method according to the first possible implementation form of the third aspect or to the third aspect as such, at least two of the allocated plurality of PRBs are located at the same frequency and within different contiguous time slots.

In a third possible implementation form of a method according to any of the preceding possible implementation forms of the third aspect or to the third aspect as such, the allocation information further comprises at least one of a modulation type and a modulation level for the allocated plurality of PRBs.

In a fourth possible implementation form of a method according to the third possible implementation form of the third aspect or to the third aspect as such, at least one of the frequency location and the number of allocated plurality of PRBs is jointly encoded with at least one of the modulation type and the modulation level.

In a fifth possible implementation form of a method according to any of the preceding possible implementation forms of the third aspect or to the third aspect as such, the allocation information is signalled as physical layer signalling in a downlink control channel, or as higher layer signalling, or as a combination thereof.

In a sixth possible implementation form of a method according to any of the preceding possible implementation forms of the third aspect or to the third aspect as such, the allocation information is signalled as indices or bitmaps.

In a further possible implementation form of a method according to the sixth possible implementation form of the third aspect, each index is associated with a bitmap and/or each index is signalled with bits in a downlink control channel.

In a seventh possible implementation form of a method according to the sixth possible implementation form of the third aspect or to the third aspect as such, each index is associated with a set of allocated PRBs contiguously located in the frequency domain and configured by higher layers.

In an eighth possible implementation form of a method according to the seventh possible implementation form of the third aspect or to the third aspect as such, there are at least two sets of allocated PRBs having different sizes.

In a ninth possible implementation form of a method according to any of the preceding possible implementation forms of the third aspect or to the third aspect as such, the method further comprises receiving uplink control information in the PUCCH from the user device in response to signalling the allocation information.

According to a fourth aspect of the disclosure, the above mentioned and other objectives are achieved with a method for a wireless communication system, the method comprising:

determining uplink control information for one or more network nodes;

transmitting the uplink control information in a PUCCH to the one or more network nodes, wherein a plurality of PRBs are allocated for the PUCCH and wherein the PUCCH has a PUCCH format defined for two or more PRBs.

In a first possible implementation form of a method according to the fourth aspect, the method further comprises receiving allocation information from the one or more network nodes in physical layer signalling or in higher layer signalling or in a combination thereof, wherein the allocation information comprises a frequency location and a number of allocated plurality of PRBs;

transmitting the uplink control information in the PUCCH according to the allocation information.

The advantages of the methods according to the third aspect or the fourth aspect are the same as those for the corresponding device claims according to the first and second aspects.

The present disclosure also relates to a computer program, characterized in code means, which when run by processing means causes said processing means to execute any method according to the present disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present disclosure will be apparent from the following detailed description.

BRIEF DESCRIPTION OF THE DRAWINGS

The appended drawings are intended to clarify and explain different embodiments of the present disclosure, in which.

DETAILED DESCRIPTION

The inventor has identified a number of issues and drawbacks of conventional techniques, such as related art LTE and LTE-Advanced, which are solved by embodiments of the present disclosure.

As more spectrum becomes available, e.g., in higher frequency bands or in unlicensed frequency bands, it would be beneficial to introduce UEs with capability of aggregating more than 5 serving cells. Also, LTE-Advanced Rel-13 is supposed to support aggregation up to 32 serving cells for a UE, i.e., simultaneous reception of up to 32 component carriers. This significantly increases the UCI feedback and calls for new mechanisms for transmitting the UCI, e.g., new design of uplink control channels. In addition to increasing the payload capacity of the uplink control channel, it is also important to consider its time-frequency resource allocation. Since the uplink also comprises data channels, it is crucial to minimize the resource usage of the uplink control channel as well as provide efficient multiplexing between the data and control channels in the uplink. Moreover, the UE needs to be able to determine which time-frequency resources it should use for transmitting the uplink control channels. Therefore, a new mechanism for transmitting larger UCI payloads need to include an efficient uplink control channel resource reservation scheme.

It is further realized that the UCI payload can vary significantly depending on the carrier configurations. For example, if spatial multiplexing is assumed for the PDSCH, 2 HARQ information feedback bits need to be transmitted per carrier, i.e., 1 bit per transport block. Moreover, for Time Division Duplex (TDD) the number of HARQ information feedback bits depends on the UL subframe index and the UL/DL TDD configuration. Similarly, the CSI payload depends on the CSI reporting mode of each component carrier. Therefore, the UCI payload can vary significantly, from a few tens of bits to several hundreds of bits, depending on the configurations of the carrier aggregation. For efficient PUCCH resource utilization, it could therefore be considered to adapt the payload capacity of the PUCCH to the number of input UCI bits.

A first issue is that the existing PUCCH formats do not offer sufficient UCI payload capacity if carrier aggregation up to 32 downlink component carriers should be supported. For example, when aggregating 32 Frequency Division Duplex (FDD) component carriers and using Multiple Input Multiple Output (MIMO) transmission, 64 HARQ information feedback bits need to be accommodated (i.e., 2 HARQ-ACK bits per component carrier). Moreover, when aggregating 32 TDD component carriers with TDD UL/DL configuration 5 and using MIMO transmission, 576 HARQ information feedback bits need to be accommodated.

There would typically be two options for accommodating a larger UCI payload, which potentially also could be combined: HARQ information (e.g., ACK or NACK or DTX) could be compressed by bundling the HARQ bits, that is performing a logical AND operation among the bits. The drawback of this is an increased number of unnecessary retransmissions (i.e., reduced downlink throughput), since any ACK that is bundled with a NACK/DTX would result in a bundled NACK. Another option, e.g., for the CSI reports, is to drop information. For example, if the payload becomes too large, certain CSI reports are prioritized according to some rules. The drawback of this is that it takes longer for the eNodeB to retrieve CSI reports for all carriers. By increasing the amount of time-frequency resources, a higher payload capacity could be obtained. This could be achieved by using more than 1 PRB pair for a PUCCH transmission, or reducing the UE multiplexing capacity of the PUCCH format. Another option is to increase the modulation level, e.g., to 16 QAM. The existing PUCCH formats do not allow multiple PRB pair allocations or usage of multiple modulation levels.

A second issue is that, a new PUCCH resource reservation scheme would be needed if a new PUCCH format is designed. A new PUCCH format could require a separate set of PUCCH resources, such that existing PUCCH resource reservation schemes are not applicable. The existing PUCCH resource allocation schemes are inflexible in at least two aspects: a new PUCCH format capable of a larger payload may benefit from utilizing DFT-precoding such that the resulting waveform is Single Carrier Frequency Division Multiplex Access (SC-FDMA), which reduces the power dynamics of the transmitted signal. Therefore, such a PUCCH format needs to be transmitted on two or more contiguous PRBs within a time slot. That would require joint allocation of PUCCH regions k, k+2, . . . , which is not supported in LTE.

Figure 1:
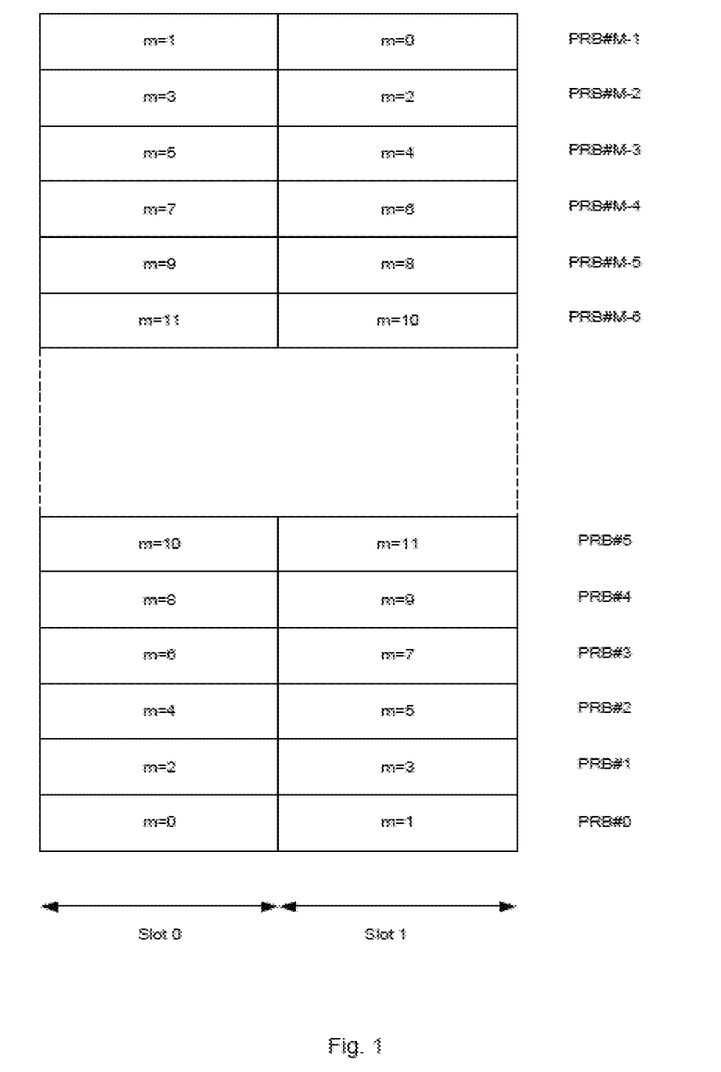
FIG. 1 shows PUCCH regions.

A PUCCH region comprises different frequency locations of the PRBs in the two time slots. The benefit from this is increased frequency diversity. On the other hand, that makes it impossible to interpolate channel estimates obtained from reference signals in the two respective PRBs. A new PUCCH format capable of a larger payload may benefit from being able to use the same PRB in the two time slots. This may reduce the frequency diversity but could make it possible to reduce the reference signal overhead, since it becomes possible to interpolate channel estimates obtained from reference signals in the two respective PRBs. The existing PUCCH resource allocation schemes do not support using the same PRB in both time slots. The PUCCH in LTE- Advanced comprises several PUCCH formats (e.g., formats 1/1a/1b/2/2a/2b/3), each being used for a particular purpose of SR transmission, HARQ feedback and periodic CSI reporting. The payload of these PUCCH formats range from 1 to 22 information bits. PUCCH formats 1/1a/1b/2/2a/2b are based on modulated sequences, while PUCCH format 3 is using DFT-spread transmission. Several of the PUCCH formats also include CDM transmission, such that multiple UEs could be transmitting the PUCCH on the same PRB pair by utilizing different sequences. PUCCH formats 1/1a/1b/2/2a/2b could share the same PRB pair, while PUCCH format 3 PRB pairs cannot be shared with other PUCCH formats. A characterizing feature is that all the PUCCH formats utilize QPSK modulation and occupy only 1 PUCCH region, which comprises one PRB pair. FIG. 1 shows an example of the location of 12 PUCCH regions, m=0, 1, . . . , 11, in a subframe (i.e., two time slots) for a carrier having M PRBs. A PRB comprises 180 kHz and 0.5 ms (i.e., one time slot). A PUCCH region comprises 1 PRB in the first time slot and 1 PRB in the second time slot.

A third issue is that the UCI payload may vary significantly. The UCI payload may be different depending on if it comprises HARQ-ACK information and/or CSI reports. Such payload variations may occur on subframe level depending on how many serving cells that are scheduled and how the periods of the CSI reports are arranged. Thus, it can be anticipated that in certain subframes, the UCI payload will be comparatively smaller than in other subframes.

To solve the above and further issues and drawbacks embodiments of the present disclosure relates to a network node, a user device, a wireless communication system, and methods thereof.

Figure 2:
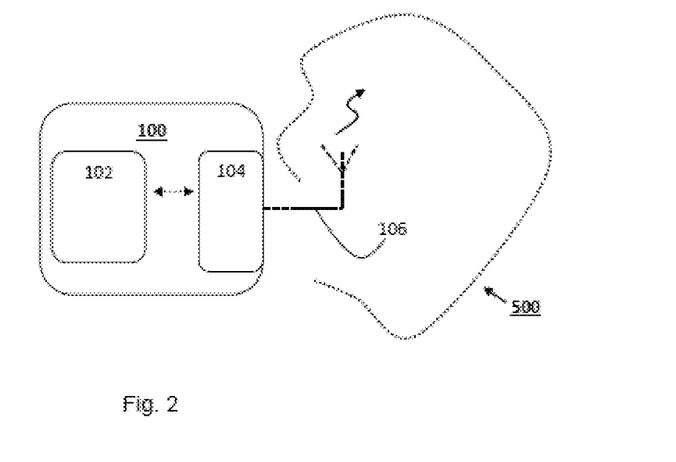
FIG. 2 shows a first network node according to an embodiment of the present disclosure.

FIG. 2 shows a network node 100 according to an embodiment of the present disclosure. The network node 100 has the capabilities to communicate in a wireless communication system 500 as illustrated in FIG. 2. The network node 106 includes one or more optional antennas 106 which are coupled to a transceiver 104 of the network node 100. The network node 100 further comprises a processor 102 communicably coupled with the transceiver 104 by means of communication means known in the art. The processor 102 of the network node 100 is configured to allocate a plurality of PRBs for the present PUCCH. The present PUCCH has at least one new PUCCH format that is defined for two or more PRBs. The allocated plurality of PRBs are associated with a user device 300 (see FIG. 4) of the wireless communication system 500. This means that the allocated plurality of PRBs are intended to be used by the user device 300 for transmission of uplink control information. It should however be noted that the same PRBs may be allocated to more than one user device 300 if code division multiplexing or other orthogonal multiplexing methods are used.

The transceiver 104 of the network node 100 is configured to signal allocation information to the user device 300. The mentioned allocation information comprises information about the allocation of the plurality of PRBs for the PUCCH. The allocation information at least comprises the frequency location of the allocated plurality of PRBs and the number of allocated plurality of PRBs.

The present network node 100, or base station, e.g. a Radio Base Station (RBS), which in some networks may be referred to as transmitter, "eNB", "eNodeB", "NodeB" or "B node", depending on the communication technology and terminology used. The radio network nodes may be of different classes such as e.g. macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

Figure 3:
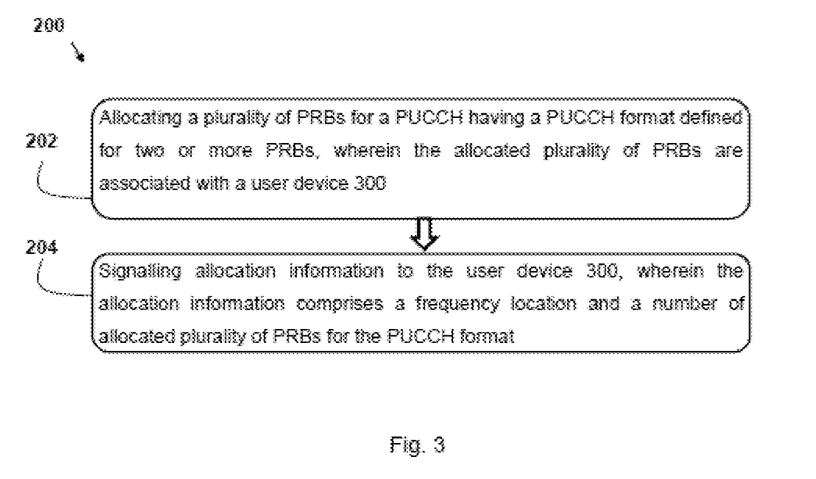
FIG. 3 shows a method according to an embodiment of the present disclosure.

FIG. 3 shows a corresponding method 200 according to an embodiment of the present disclosure. The method 200 may be executed in a network node 100, such as the one shown in FIG. 2. The method 200 comprises the step of allocating 202 a plurality of PRBs for a PUCCH having the new PUCCH format defined for two or more PRBs. The allocated plurality of PRBs are as mentioned above associated with at least one user device 300. The method 200 finally comprises the step of signalling 204 allocation information to the user device 300. The allocation information comprises the frequency location of the allocated plurality of PRBs for the PUCCH format and the number of allocated plurality of PRBs for the PUCCH format.

In one embodiment of the present disclosure, the present PUCCH format is defined for but is not limited to the cases of: more than two PRBs; more than one PRB in one time slot; PRBs associated with more than one PUCCH region; and to combinations thereof of these three cases.

Figure 4:
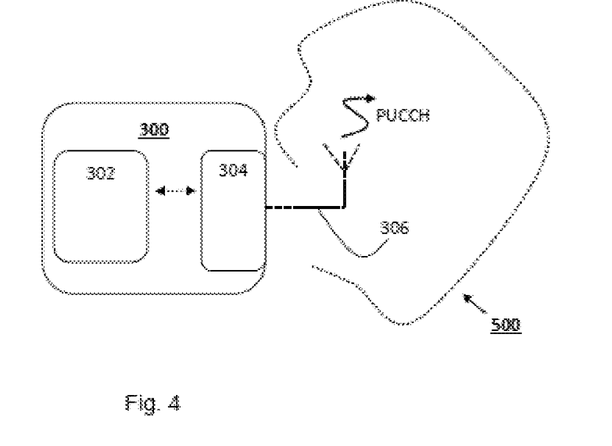
FIG. 4 shows a second network node according to an embodiment of the present disclosure.

FIG. 4 shows a user device 300 according to an embodiment of the present disclosure. The user device 300 comprises a processor 302 and a transceiver 304. The processor 302 is communicably coupled with the transceiver 304 by means of communication means known in the art. In the embodiment shown in FIG. 4 the user device 300 further comprises one or more optional antennas 306 coupled to the transceiver 304. The processor 302 of the user device 300 is configured to determine uplink control information for one or more network nodes 100a, 100b, . . . , 100n (see FIG. 6). The control information relates to information about the transmissions between the user device 300 and the network node 100, such as SR transmission, HARQ feedback and periodic CSI reporting. The transceiver 304 of the user device 300 receives the uplink control information from the processor 302 and is further configured to transmit the uplink control information in the new PUCCH to the one or more network nodes 100a, 100b, . . . , 100n. A plurality of PRBs are allocated for the present PUCCH in which the user device 300 transmits the control information and the PUCCH has the new PUCCH format defined for two or more PRBs as described above.

The User Device (UD) 300 or UE, mobile station, wireless terminal and/or mobile terminal is enabled to communicate wirelessly in a wireless communication system 500, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM)

Figure 5:
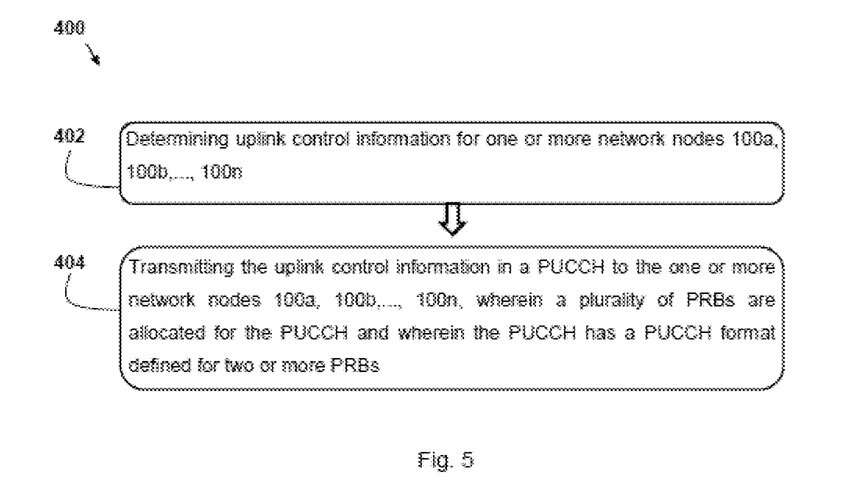
FIG. 5 shows another method according to an embodiment of the present disclosure.

FIG. 5 shows a corresponding method 400 according to an embodiment of the present disclosure. The method 400 may be executed in a user device 300, such as the one shown in FIG. 4. The method 400 comprises the step of determining 402 uplink control information for one or more network nodes 100a, 100b, . . . , 100n. The method 400 finally comprises the step of transmitting 404 the uplink control information in the present PUCCH to the one or more network nodes 100a, 100b, . . . , 100n. A plurality of PRBs are allocated for the PUCCH and the PUCCH has a PUCCH format defined for two or more PRBs.

According to an embodiment of the present disclosure, the transceiver 304 of the user device 300 is further configured to receive allocation information from the one or more network nodes 100a, 100b, . . . , 100n in physical layer signalling or in higher layer signalling or in a combination thereof. The allocation information at least comprises as described above, in respect of the network node 100, the frequency location and the number of allocated plurality of PRBs for the PUCCH. Further, the transceiver 304 of the user device 300 is further configured to transmit the uplink control information in the PUCCH according to the allocation information. This means that the user device 300 transmits the uplink control information in the frequency location(s) and the number of allocated plurality of PRBs as given in the allocation information. If further allocation information is included in the allocation information the user device 300 will also transmit the uplink control information according to that further allocation information, e.g., modulation type and/or modulation level.

In the following description LTE or LTE-Advanced terminology and context is used for describing further embodiments of the present disclosure. It should however be noted that the network node 100, user device 300 and methods 200, 400 of embodiments of the present disclosure is not limited to mentioned LTE or LTE-Advanced systems and can be used and applied in a multitude of different wireless communication systems.

Generally, the present solution considers a new PUCCH format which can be transmitted on at least 2 PRB pairs. In LTE-Advanced, such a PUCCH format could, e.g., be based on extending PUCCH format 3 to multiple PRBs in a time slot or utilizing a Physical Uplink Shared Channel (PUSCH) based structure with multiple PRBs in a time slot. Typically, within a time slot, the at least 2 PRB pairs would be located contiguously next to each other in the frequency domain in order to preserve low power dynamics of the uplink control channel. However, although the PUCCH format accommodates transmission on at least 2 PRB pairs (e.g., at least 2 PRBs in one time slot and at least 2 PRBs in another consecutive time slot) embodiments of the present disclosure does not preclude that the actual transmission is on 1 PRB pair only (e.g., 1 PRB in one time slot and 1 PRB in another consecutive time slot). A skilled person may also understand that the disclosure is applicable when the PUCCH format which can be transmitted on at least two PRB pairs, is alternatively represented as multiple PUCCH formats, where the different PUCCH formats exhibit the same basic transmission structure but are using different number of PRBs.

In one embodiment of the present disclosure the network node 100 provides the user device 300 with the information entity $\Delta$ from which the user device 300 can deduce properties for the new PUCCH format. The information entity $\Delta$ comprises allocation information about the allocation of the PRBs of the PUCCH format. The use of the information entity $\Delta$ in this disclosure is for the purpose for better understanding of the present solution but is not limited thereof. This means that other solutions without the use of the information entity $\Delta$ are possible.

In one embodiment of the present disclosure, the number of PRB pairs used for the new PUCCH format is not variable, e.g., it is always P (P>1) PRB pairs. Thus, information about the number of allocated PRBs and/or frequency location of the allocated PRBs can be obtained by a predefined rule(s) and does not need to be provided by the network node 100 to the user device 300 by signalling. This means that the user device 300 by knowing the predefined rule also knows how, where and in which resources for transmitting the uplink control information.

However, in another embodiment of the present disclosure, the number of PRB pairs allocated for the transmission in the new PUCCH format is variable and dynamic. This is advantageous for minimizing the resource overhead and achieving sufficient detection performance. The number of allocated PUCCH resources relate to the number of coded bits on which the UCI can be transmitted. Thus, since the UCI payload may vary, it is advantageous to allow the eNodeB to control the number of allocated PUCCH resources as a means to adjust the code rate (i.e., the ratio of the number of UCI payload bits and coded bits). Embodiments of the present disclosure is also applicable to the cases where the user device 300 determines the allocation information I about number of allocated plurality of PRBs and frequency location of the allocated plurality of PRBs only from $\Delta$, or from $\Delta$ and parameters that can be obtained from the downlink control channel which schedules the associated downlink data transmission, such as the Physical Downlink Shared Channel (PDSCH). For example, in the former case the allocation information can be a function such as I=f($\Delta$), and in the latter case the allocation information could be a function I=f($\Delta$, $n_{CCE}$), where $n_{CCE}$ is an index derived from the time-frequency resources used for the associated downlink control channel, e.g., PDCCH or EPDCCH.

Figure 6:
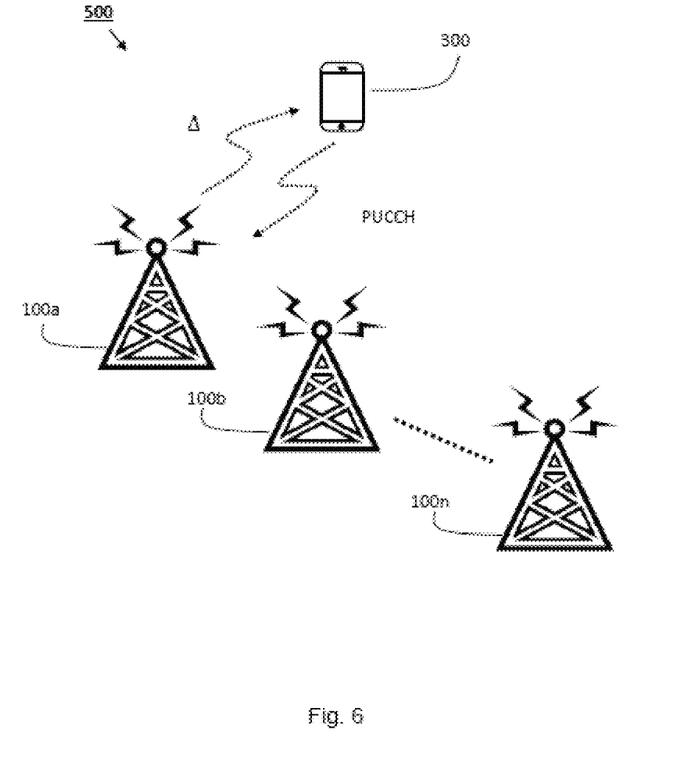
FIG. 6 shows a wireless communication system according to an embodiment of the present disclosure.

FIG. 6 shows a wireless communication system 500 according to an embodiment of the present disclosure. The wireless communication system 500 comprises at least one network node 100 and at least one user device 300. However, a plurality of network nodes 100a, 100b, . . . , 100n are shown in the example in FIG. 6. The interaction between the user device 300 and the network nodes 100a, 100b, . . . , 100n is also illustrated in FIG. 6.

The network node 100a in FIG. 6 signals the allocation information in the form of an information entity $\Delta$ to the user device 300 in the downlink. The signalling to the user device 300 can be in physical layer signalling or in higher layer signalling or in a combination thereof which is more explained in the following description. The user device 300 receives the information entity $\Delta$. After determining uplink control information the user device 300 transmits the uplink control information in the PUCCH according to the allocation information in the information entity $\Delta$.

The uplink control information may be transmitted to only network node 100a or also to the other network nodes 100b, . . . , 100 of the wireless communication system 500. It is possible that one network node 100 transmits the allocation information to the user device 300 and that another network node 100 receives the uplink control information. For example, network node 100a can transmit the allocation information to the user device 300 and network node 100b can receive the uplink control information from the user device 100. Therefore, the transceiver 104 of the present network node 100 is further configured to receive the uplink control information in the new PUCCH format from the user device 300 in response to transmitting the allocation information to the user device 300 according to a further embodiment.

In one embodiment of the present disclosure, the information entity $\Delta$ is configured by higher-layer signalling, e.g., Medium Access Control (MAC) or Radio Resource Control (RRC) signalling. An advantage of this is the simplicity and low overhead in terms of providing the allocation information to the user device 300. On the other hand, the flexibility and the adaptation capability between using different number of PRB pairs or modulation levels is lower. A higher-layer configured information entity would be useful if the UCI information is not associated with any downlink control channel, e.g., if it comprises only CSI reports. Thereby, the user device 300 does not need to obtain the uplink PUCCH resources by means of a downlink control channel, which saves overhead in the downlink of the wireless communication system 500.

In one embodiment of the present disclosure, the allocation information is provided by a combination of higher-layer signalling (e.g., MAC or RRC signalling) and physical layer signalling in the downlink control channel. As an example, suppose that the associated downlink control channel, e.g., PDCCH or EPDCCH, comprises an indicator $\Delta_i$, i=0, 1, . . . , K-1, capable of addressing K number of different states. This indicator $\Delta_i$ could be facilitated by signalling $\lceil \log_2 (K) \rceil$ bits or utilizing unused states and combinations of the existing bits in the downlink control channel. For example, it could be sufficient that certain downlink control information bits are not needed for PDCCH/EPDCCHs transmitted on the secondary serving cells. Therefore, it could be possible to utilize such bits from downlink control channels not being associated with the downlink data transmission on the primary serving cell for carrying the indicator $\Delta_i$. If these bits are not sufficient, additional new bits could be inserted or unused states and combinations of the existing bits in the downlink control channel could be utilized.

For each of the mentioned K states, in one example, a corresponding higher-layer information entity $b_i$ is configured. This entity would convey information according to number of allocated plurality of PRBs and frequency location of the allocated plurality of PRBs. The higher-layer information entities could be UE-specifically configured, which provides full flexibility in efficiently allocating the resources, since different UEs may be configured with different numbers of component carriers and thereby require different UCI payload and consequently have different need of PUCCH resources. Thus, a given state may correspond to different number and/or positions of the PRBs for different UEs. An advantage of utilizing a combination of physical layer signalling and higher-layer configured entities $b_i$ is that it allows dynamic switching between the number of PRB pairs used for the transmission, which in beneficial for adapting the resource utilization to the actual UCI payload, which can vary significantly depending on the carrier aggregation configuration. Thereby, the uplink control channel overhead can be reduced. It is realized that if N PRB pairs can be allocated to the transmission, there are $\Sigma_{k=1}^{N} k = N(N+1)/2$ unique combination of contiguous PRB pairs of size 1 to N. In one further example, this allocation information is provided by $K = \lceil \log_2 (N(N+1)/2) \rceil$ bits associated with $N(N+1)/2$ bitmaps of size N, where a '1' in the bitmap corresponds to an allocated PRB pair. The definition of the bitmaps could either be predefined or be configured by higher layers. Table 1 shows an example of indicator $\Delta_i$.

Table 1 also gives an example of bitmaps $b_i=[c_0 c_1 c_2 c_3]$ for N=4, where $c_i$ denotes an index to a PRB pair. The user device 300 could associate a bitmap index $c_i$ to a PRB pair position (or PUCCH region) by higher-layer configuration. For example, an offset value $\delta$ could be configured such that the user device 300 determines the PRB pair position as n=f($\Delta_i$)+$\delta$, where $\delta$ corresponds to the PRB pair position for $c_0$.

TABLE 1

Example of resource allocation for PUCCH

| $\Delta_i$ | $[c_0 c_1 c_2 c_3]$ | R | $b_i$ |
|---|---|---|---|
| 0 | [0001] | 3 | 1 |
| 1 | [0010] | 2 | 2 |
| 2 | [0100] | 1 | 4 |
| 3 | [1000] | 0 | 8 |
| 4 | [0011] | 6 | 2, 1 |
| 5 | [0110] | 5 | 4, 2 |
| 6 | [1100] | 4 | 8, 4 |
| 7 | [0111] | 9 | 4, 2, 1 |
| 8 | [1110] | 8 | 8, 4, 2 |
| 9 | [1111] | 7 | 8, 4, 2, 1 |

The interpretation of the bitmap could also be so that either:

a bit '1' corresponds to a PRB index to be used in both time slots; or a bit '1' corresponds to a PUCCH region.

The first interpretation allows using the same PRB in both time slots. The second interpretation allows using allocations by means of PUCCH regions, while utilizing contiguous PRBs in a time slot.

Another representation of a bitmap with only contiguous bit combinations is to use an index R. Suppose that the N available PRB pairs are enumerated from 1 to N−1 and that the allocation comprises L PRB pairs with the first PRB pair starting at an index S, then the single index R could encode all eligible allocations according to:

$$\text{If } L - 1 \leq \left\lfloor \frac{N}{2} \right\rfloor$$
$$R = N(L - 1) + S$$
$$\text{Else}$$
$$R = N(N - L + 1) + (N - 1 - S).$$

As an example, this would give the indices of R listed in Table 1. Thus, one realization of the embodiment is that $\Delta_i$=R. The receiver could associate an index to a PRB pair position (or PUCCH region) by higher-layer configuration. For example, an offset value $\delta$ could be configured such that the user device 300 determines the PRB pair position as n=f($\Delta_i$)+$\delta$, where $\delta$ corresponds to the PRB pair position for a given index R. Also in this case, the interpretation of the index could allow using the same PRB in both time slots or allocations by means of PUCCH regions, while utilizing contiguous PRBs in a time slot.

An advantage of this embodiment of the present disclosure is a better reuse of the PUCCH resources. For example, it would be possible to let some of the configured PRB pairs overlap with PRB pairs allocated for other PUCCH formats. By using the dynamically signalled parameter $\Delta_i$, collisions between PUCCH formats could be avoided. For example, in Table 1, if index $c_0$ corresponds to a PRB pair overlapping with another PUCCH format which is occupied in the given subframe, the eNodeB could still perform the resource allocation by not signalling $\Delta_i$=3, 6, 8, 9.

As to further reduce the number K and the amount of bits needed to convey $\Delta_i$, it is possible to only allow a subset of the contiguous allocations. For example, in Table 1, 4 bits would suffice if only states 3, 6, 8 and 9 are allowed. That is, the four states correspond to a transmission on 1, 2, 3 or 4 PRB pairs, respectively.

In another embodiment of the present disclosure, in order to reduce the number of states which need to be signalled, the information entity $\Delta_i$ corresponds the number of PRB pairs to be used for the transmission and the PRB pair positions are obtained by function $n=f(\Delta_i)+\delta$ where $\delta$ is a higher layer configured offset value. For example, $f(\Delta_i)=\Delta_i+1$ when $\Delta_i=0, 1, \ldots$.

In another embodiment of the present disclosure, the allocation information is provided by directly letting an entity $b_i$ comprise indices to the PRB pairs (or PUCCH regions) used for the transmission of the new PUCCH format, without utilizing any bitmaps. This requires that one or several indices are associates to each state of $\Delta_i$. This implies that different $\Delta_i$ will be associated with different numbers of indices. An example of such a representation is also given in Table 1. These indices may be higher-layer configured.

In one embodiment of the present disclosure, the information entity $\Delta$ is only provided by physical layer signalling. This gives maximum freedom in allocating the PRB pairs but could require slightly more overhead. For example, if the carrier bandwidth is M resource blocks, $\lceil \log_2 (M/(M+1)/2) \rceil$ bits would be needed in the downlink control channel for determining the number of and positions of the contiguous PRB pairs to be used for transmission.

In one embodiment of the present disclosure, the allocated PRB pairs are contiguous in frequency within a time slot but all the available resources (from which the allocation is made) are not necessarily contiguous. This is advantageous for example if the new PUCCH format is used for CSI reporting. It may be favourable to allocate a set of contiguous higher-layer configured PRB pairs close to the carrier edge for this purpose. At the same time, it could be beneficial to reserve a set of PRB pairs closer to the centre of the carrier, in order to predominately carry the HARQ-ACK information. Therefore, in a subframe wherein there is not supposed to be any CSI reports, but HARQ-ACK information, it should be possible to use the high-layer configured CSI reporting PRB pairs for transmission of the PUCCH containing the HARQ-ACK information.

An example in its most general form is contained in Table 2, wherein each indicator $\Delta_i$ is associated with one or several higher-layer configured entities $b_i$, each corresponding to a PRB pair (or PUCCH region). For example, for $\Delta_i=4$, the two entities $b_i=4$ and $b_i=5$ are associated with two contiguous PRB pairs (or PUCCH regions), while for $\Delta_i=5$, the two entities $b_i=6$ and $b_i=7$ are associated with another two disjoint contiguous PRB pairs (or PUCCH regions). Hence, suppose $b_i=6$ and $b_i=7$ are associated with PRB pairs located close to the carrier edge, and that these resources have also been configured by higher layers to accommodate CSI reporting, then it would be possible to that also UCI in form of HARQ-ACK could utilize these resources when $\Delta_i=5$ is provided.

TABLE 2

Example of resource allocation for PUCCH

| $\Delta_i$ | $b_i$ |
|---|---|
| 0 | 0 |
| 1 | 1 |
| 2 | 2 |
| 3 | 3 |
| 4 | 4, 5 |
| 5 | 6, 7 |
| 6 | 8, 9 |

TABLE 2-continued

Example of resource allocation for PUCCH

| $\Delta_i$ | $b_i$ |
|---|---|
| 7 | 10, 11, 12 |
| 8 | 13, 14, 15 |
| 9 | 16, 17, 18, 19 |

The resource allocation provides a number of PRB pairs for the UCI transmission, which relates to the code rate of the UCI transmission, since it determines the number of coded bits. Thus, for a fixed UCI payload, a larger number of allocated PRB pairs lowers the code rate, which improves the detection performance of the UCI. This may render that the downlink carrier aggregation can be performed on a larger area in the cell, since the PUCCH can be decoded at lower signal-to-noise ratios. It is further understood that additional adjustment of the code rate is possible by the disclosure by relating the number of UCI payload bits to the allocated number of PUCCH resources. This may be achieved by letting the index $\Delta_i$ additionally be related to the number of UCI payload bits according to some predefined rule. For example, if the UE is only scheduled on a small number of its configured downlink component carriers (say it is configured with X number of component carriers), the value $\Delta_i$ could additionally inform the UE to only feedback HARQ-ACK information as if it was configured with Z (where Z<X) downlink component carriers. This may reduce the code rate since the number of information bits is reduced, which may require even less allocated number of PRB pairs, thereby saving overhead.

In one embodiment of the present disclosure, the information entity $\Delta$ further makes it possible to determine the modulation order and/or modulation type to be used in the new PUCCH format. This is advantageous since it allows more efficient control of the uplink control channel resources. For example, if the user device 300 is experiencing good channel conditions, it may employ higher order modulation and utilize less PRB pairs for its uplink control channel. This property can be combined with the aforementioned embodiments concerning providing information for number of allocated plurality of PRBs and frequency location of the allocated plurality of PRBs.

In one embodiment of the present disclosure, the indication of the modulation level and/or modulation type is provided by physical layer signalling and is separately encoded from the entities providing information about number of allocated plurality of PRBs and frequency location of the allocated plurality of PRBs. For example, an indication whether to use Quadrature Phase Shift Keying (QPSK) or 16 Quadrature Amplitude Modulation (QAM), i.e., modulation types, could be enabled by a single bit in the downlink control channel, or some unused state of the existing bits in the downlink control channel.

In one example, the indication of the modulation level is provided by physical layer signalling and is jointly encoded from the network node 100 providing information about number of allocated plurality of PRBs and frequency location of the allocated plurality of PRBs. An advantage of this is that it could reduce the number of bits needed to be transmitted in the downlink control channel. It can be noted that in many cases $\lceil \log_2 (N(N+1)/2) \rceil > \log_2 N(N+1)/2$, thus there may be bits unused for determining allocation information about number of allocated plurality of PRBs and frequency location of the allocated plurality of PRBs, which could be used for determining information about modulation level and/or modulation type. Table 3 shows one example of joint encoding utilizing in total 4 bits.

TABLE 3

Example of 10 bitmaps of length 4 and modulation type

| $\Delta_i$ | $[c_0 c_1 c_2 c_3]$ | Modulation |
|---|---|---|
| 0 | [0001] | QPSK |
| 1 | [0010] | QPSK |
| 2 | [0100] | QPSK |
| 3 | [1000] | QPSK |
| 4 | [0011] | QPSK |
| 5 | [0110] | QPSK |
| 6 | [1100] | QPSK |
| 7 | [0111] | QPSK |
| 8 | [1110] | QPSK |
| 9 | [1111] | QPSK |
| 10 | [0001] | 16 QAM |
| 11 | [0010] | 16 QAM |
| 12 | [0100] | 16 QAM |
| 13 | [1000] | 16 QAM |
| 14 | [0011] | 16 QAM |
| 15 | [0110] | 16 QAM |

Another example is to associate certain resource allocations with certain modulation levels. Table 4 gives a non-limiting example where information about number of allocated plurality of PRBs and frequency location of the allocated plurality of PRBs and modulation level and/or modulation type are jointly encoded. A person skilled in the art may combine the indication of modulation level and/or type with any of the previously embodiments for indicating the PRB pair allocation for the new PUCCH format.

TABLE 4

Example of 10 bitmaps of length 4 and modulation type

| $\Delta_i$ | $[c_0 c_1 c_2 c_3]$ | Modulation |
|---|---|---|
| 0 | [0001] | QPSK |
| 1 | [0010] | 16 QAM |
| 2 | [0100] | QPSK |
| 3 | [1000] | 16 QAM |
| 4 | [0011] | QPSK |
| 5 | [0110] | 16 QAM |
| 6 | [1100] | QPSK |
| 7 | [0111] | QPSK |
| 8 | [1110] | QPSK |
| 9 | [1111] | QPSK |

Moreover, FIGS. 7-10 illustrate examples of time and frequency allocation for PUCCH formats according to the present solution in an exemplary LTE context. The examples are given for time slots 0 and 1 (denoted as "slot" in FIGS. 7-10).

Figure 7:
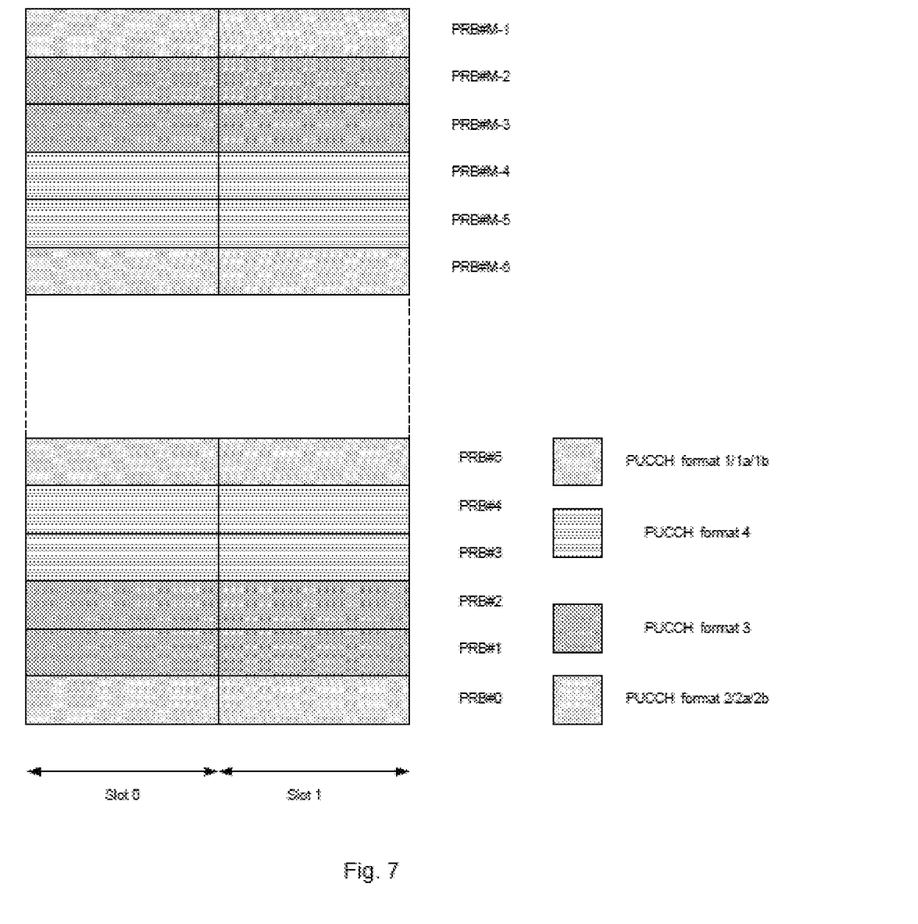
FIG. 7 illustrates an example of resource allocation for PUCCH formats according to an embodiment of the present disclosure.

FIG. 7 shows a PUCCH resource reservation where a new multi-PRB pair PUCCH format, here referred to as PUCCH format 4, is located between the PUCCH format 3 and PUCCH format 1/1a/1b resources. If there would be no need to transmit new PUCCH format 4 in a subframe, its resources would comprise unnecessary overhead since the freed up resources are not located in the PUSCH region and can therefore not be easily reused for PUSCH transmission. It should be noted that new PUCCH format 4 is only and exemplary PUCCH format of the present solution and is therefore not limited thereof.

Figure 8:
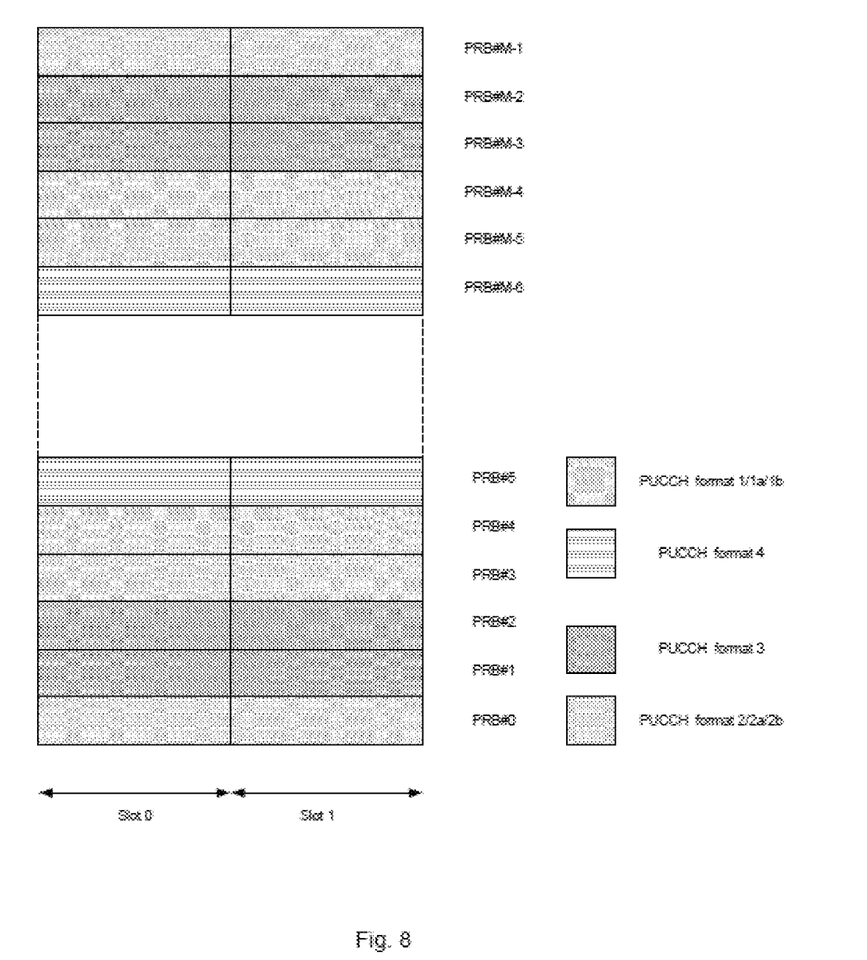
FIG. 8 illustrates a further example of resource allocation for PUCCH formats according to an embodiment of the present disclosure.

FIG. 8 shows another example of PUCCH resource reservation where the PUCCH resources for the so called PUCCH format 4 is located towards the centre of the carrier. If not all PUCCH format 1/1a/1b resources would be used, this would also comprise additional overhead since the free PRB pairs (m=4, m=M−5) cannot easily be used for PUSCH scheduling the PUSCH.

Figure 9:
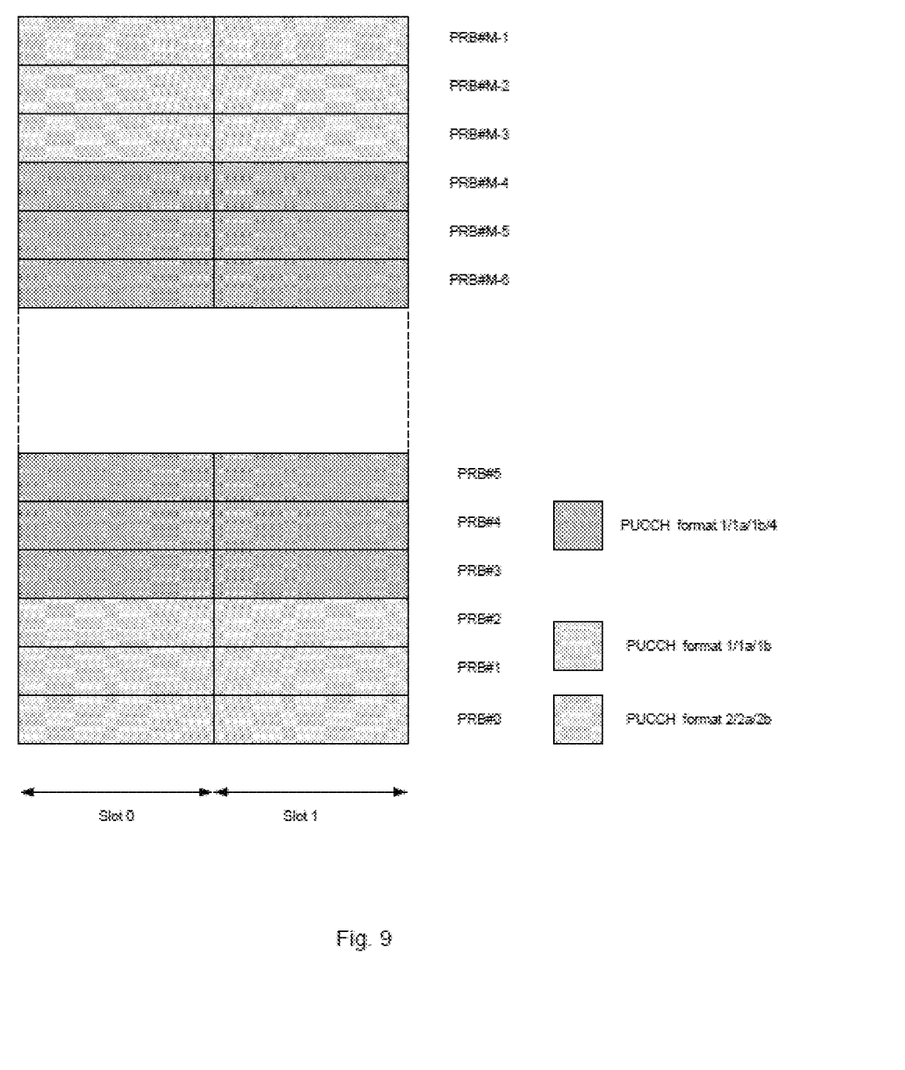
FIG. 9 illustrates a further example of resource allocation for PUCCH formats according to an embodiment of the present disclosure.

FIG. 9 shows an example where a set of higher layer PRB pairs (PUCCH regions 6-11) are allocated to the new PUCCH format 4 while at the same time PUCCH regions 2-11 are allocated to PUCCH formats 1/1a/1b. Thus, although these PUCCH formats cannot be transmitted in the same PRB pairs simultaneously, the PUCCH resources are configured to overlap, i.e., occupy the same PUCCH resources as for another PUCCH format. Thus, if in a given subframe, only PUCCH regions 2-5 are needed for PUCCH formats 1/1a/1b, PUCCH regions 6-11 could be used for the new PUCCH format 4. This allows maximum reuse of the control channel resources. Similarly, if PUCCH format 1/1a/1b need to utilize PUCCH regions 6 and 7, new PUCCH format 4 could still be used in PUCCH regions 8-12, and so on.

Figure 10:
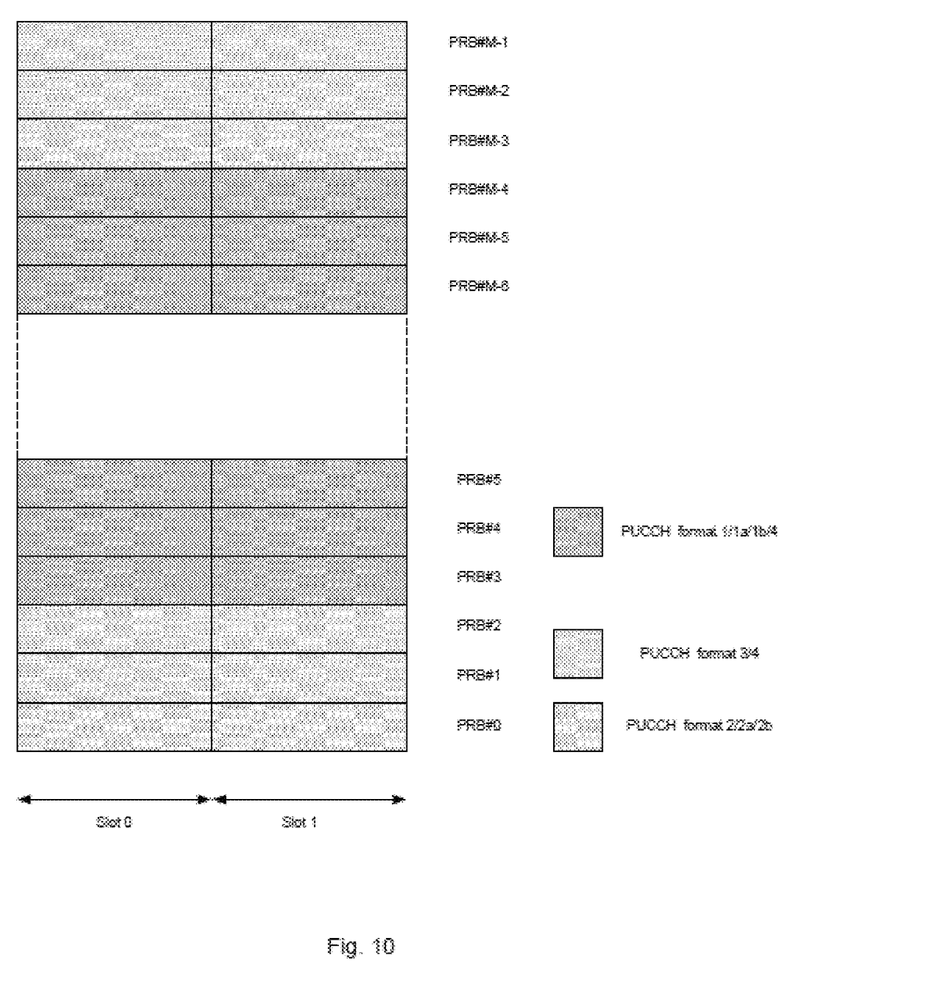
FIG. 10 illustrates a further example of resource allocation for PUCCH formats according to an embodiment of the present disclosure.

FIG. 10 shows another example of overlapping where it is assumed that new PUCCH format 4 could be multiplexed on the same PRB pair used for PUCCH format 3 transmissions. PUCCH format 3 resources are allocated to PUCCH regions 2-5, while new PUCCH format 4 resources are allocated to PUCCH regions 2-11, which partially overlaps with the PUCCH format 1/1a/1b resources in PUCCH regions 6-11. Thus, when the eNodeB could assure that it does not need to utilize some or all PUCCH format 1/1a/1b resources in PUCCH regions 6-11, these PRB pairs could be released and used for new PUCCH format 4. Hence, a larger frequency reuse is obtained and more resources are released for the uplink data channel PUSCH.

Furthermore, any method according to the present disclosure may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present first network node and second network node comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the embodiments described above, but also relates to and incorporates all embodiments within the scope of the appended independent claims.

What is claimed is:

1. A network node for a wireless communication system, the network node comprising:
    a processor configured to allocate a plurality of Physical Resource Blocks (PRBs) for a Physical Uplink Control Channel (PUCCH) having a PUCCH format defined for two or more PRBs, wherein the plurality of PRBs allocated for the PUCCH are associated with a user device and at least two PRBs in the plurality of PRBs are allocated to the user device within one time slot of a radio frame; and
    a transceiver configured to signal allocation information to the user device, wherein the allocation information comprises a frequency location and a number of the plurality of PRBs.

2. The network node according to claim 1, wherein the at least two PRBs of the plurality of PRBs are contiguously located in a frequency domain.

3. The network node according to claim 1, wherein at least two PRBs of the plurality of PRBs are located at a same frequency and within different contiguous time slots.

4. The network node according to claim 1, wherein the allocation information further comprises at least one of a modulation type and a modulation level for the plurality of PRBs.

5. The network node according to claim 4, wherein at least one of the frequency location and the number of the plurality of PRBs is jointly encoded with at least one of the modulation type and the modulation level.

6. The network node according to claim 1, wherein the allocation information is signalled as physical layer signalling in a downlink control channel, or as higher layer signalling, or as a combination thereof.

7. The network node according to claim 1, wherein the allocation information is signalled as indices or bitmaps.

8. The network node according to claim 7, wherein the allocation information is signalled as indices, and wherein each index is associated with a set of allocated PRBs contiguously located in the frequency domain and configured by higher layers.

9. The network node according to claim 8, wherein there are at least two sets of allocated PRBs having different sizes.

10. A user device for a wireless communication system, the user device comprising:
    a processor configured to determine uplink control information for one or more network nodes; and
    a transceiver configured to transmit the uplink control information in a Physical Uplink Control Channel (PUCCH) to the one or more network nodes, wherein a plurality of Physical Resource Blocks (PRBs) are allocated to the user device for the PUCCH and at least two PRBs in the plurality of PRBs are allocated to the user device within one time slot of a radio frame, and wherein the PUCCH has a PUCCH format defined for two or more PRBs.

11. The user device according to claim 10, wherein the transceiver further is configured to receive allocation information from the one or more network nodes in physical layer signalling, or in higher layer signalling, or in a combination thereof, wherein the allocation information comprises a frequency location and a number of the plurality of PRBs; wherein the transceiver further is configured to transmit the uplink control information in the PUCCH according to the allocation information.

12. A non-transitory computer readable medium including a computer program with a computer readable program code that, when executed by a processor, causes a device to perform the steps of:
    allocating a plurality of Physical Resource Blocks (PRBs) for a Physical Uplink Control Channel (PUCCH) having a PUCCH format defined for two or more PRBs, wherein the plurality of PRBs allocated for the PUCCH are associated with a user device and at least two PRBs in the plurality of PRBs are allocated to the user device within one time slot of a radio frame; and
    signalling allocation information to the user device, wherein the allocation information comprises a frequency location and a number of the plurality of PRBs.

13. The non-transitory computer readable medium according to claim 12, wherein the at least two PRBs of the plurality of PRBs are contiguously located in a frequency domain.

14. The non-transitory computer readable medium according to claim 12, wherein at least two PRBs of the plurality of PRBs are located at a same frequency and within different contiguous time slots.

15. The non-transitory computer readable medium according to claim 12, wherein the allocation information is signalled as physical layer signalling in a downlink control channel, or as higher layer signalling, or as a combination thereof.

16. The non-transitory computer readable medium according to claim 12, wherein the allocation information is signalled as indices or bitmaps.

17. The non-transitory computer readable medium according to claim 16, wherein the allocation information is signalled as indices, and wherein each index is associated with a set of allocated PRBs contiguously located in the frequency domain and configured by higher layers.

18. A non-transitory computer readable medium including a computer program with a computer readable program code that, when executed by a processor, causes a device to perform the steps of:
    determining uplink control information for one or more network nodes; and
    transmitting the uplink control information in a Physical Uplink Control Channel (PUCCH) to the one or more network nodes, wherein a plurality of Physical Resource Blocks (PRBs) are allocated to the device for the PUCCH and at least two PRBs in the plurality of PRBs are allocated to the device within one time slot of a radio frame, and wherein the PUCCH has a PUCCH format defined for two or more PRBs.

19. The non-transitory computer readable medium according to claim 18, wherein the computer readable program code, when executed by the processor, further causes the device to perform the steps of:
    receiving allocation information from the one or more network nodes in physical layer signalling, or in higher layer signalling, or in a combination thereof, wherein the allocation information comprises a frequency location and a number of the plurality of PRBs; and
    transmitting the uplink control information in the PUCCH according to the allocation information.

* * * * *